May 31, 1938. G. RAYMOND 2,119,288
APPARATUS FOR TESTING GAS
Filed June 8, 1936
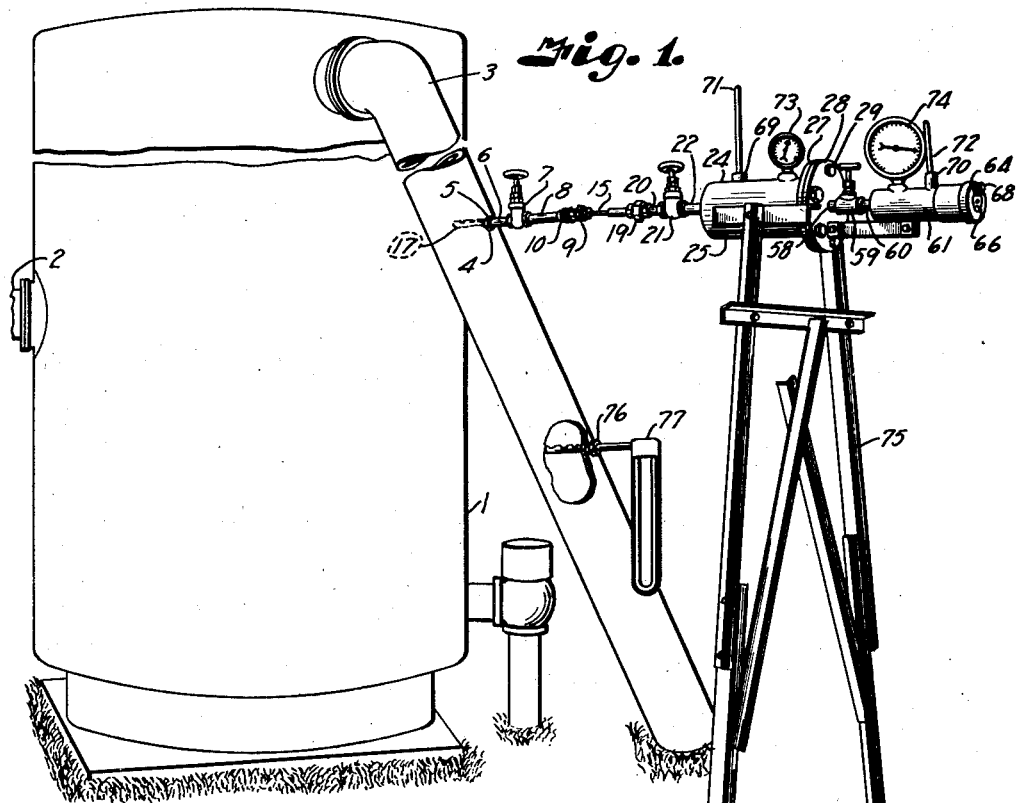
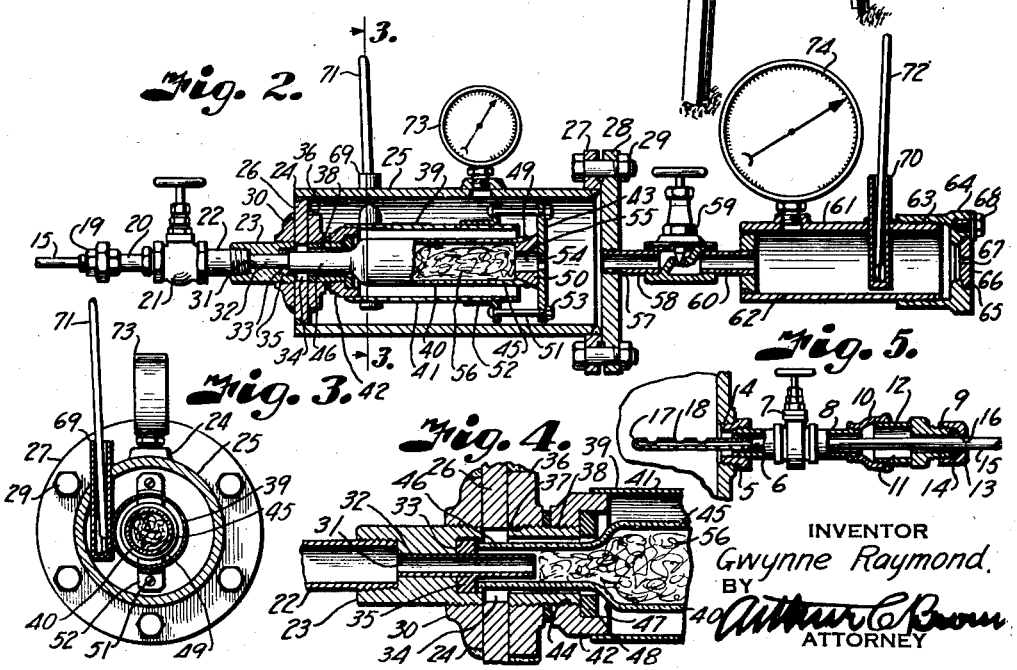
INVENTOR
Gwynne Raymond.
BY
Arthur C. Brown
ATTORNEY Patented May 31, 1938

2,119,288

UNITED STATES PATENT OFFICE 2,119,288

APPARATUS FOR TESTING GAS

Gwynne Raymond, Oklahoma City, Okla., assignor to Black, Sivalls & Bryson, Inc., Oklahoma City, Okla., a corporation of Maine Application June 8, 1936, Serial No. 84,130

7 Claims. (Cl. 73—51)

This invention relates to an apparatus for determining liquid and solid matter entrained in gas, as for example the amount of oil remaining in gas discharged from a separator, gasoline scrubber, or similar equipment.

When devices are used at a producing well to separate gas from oil, water, and substances that are undesirable in gas, such equipment should remove all particles of oil spray or other liquid carried in the gas, and the separation should be accomplished without aid of temperature change or appreciable change of pressure, so that the gas discharged therefrom is entirely free from oil, water, and other impurities. If the equipment is not operated efficiently, much oil is lost by being carried off with the gas. For example, if a well is flowing fifteen million cubic feet of gas per day and loosing six gallons of oil per million feet of gas, the loss in oil is over two barrels per day, and while it will be noted that the loss in oil represents an appreciable amount, it is very minute in proportion to the gas flow. Therefore, to accurately determine the amount of oil carried off with the gas, the measuring apparatus must be one of precision, and operated with substantial care.

It is, therefore, the principal object of the present invention, to provide for accurately ascertaining the free liquids and solids contained in a gas stream in a facile manner.

It is also an object of the invention to collect any suspended material that might be contained in a gas stream concurrently with measuring the flow volume of said stream.

In accomplishing these objects, I have provided improved details of structure, the preferred form of which is illustrated in the accompanying drawing wherein:

Fig. 1 is a perspective view of an oil and gas separator equipped with my improved apparatus for determining the oil content of the gas stream discharged therefrom.

Fig. 2 is a longitudinal section through the testing apparatus.

Fig. 3 is a cross-section on the line 3—3 of Fig. 2.

Fig. 4 is an enlarged detail section through the inlet end of the filter element.

Fig. 5 is a detail section, particularly illustrating the tube for diverting a portion of the gas stream into the testing apparatus.

Referring more in detail to the drawing:

1 designates a separator which is connected with the flow line 2 of an oil well (not shown), and wherein the natural gas content of the well flow is separated from the oil, water, and impurities that may be contained in the flow. After separation, the gas is carried off from the upper end of the separator through a gas discharge line 3, leading to a source of disposal.

In separation of this gas, the efficiency of separation may be ascertained by determining the quantity of liquid oil spray carried over with the gas, and I have provided for catching the free liquid oil, and other suspended material, by diverting a portion of the gas flow through a filtering agency.

Since the oil and gas are similar in constituents but different in phase or state, any temperature change and/or pressure change will effect the ratio of the oil and gas content of the stream, that is, as the temperature increases and/or pressure decreases, oil will pass to the gas state or condition, and as the temperature drops and/or pressure increases the gas begins changing to the oil phase. Therefore, in order to determine accurately the amount of suspended oil left entrained by the gas, it is essential that the filtering operation be carried on under as nearly as possible the actual working conditions of the separator. It is also necessary that the temperature, pressure, and volume of gas flowing from the separator be determined concurrently with filtering of a measured sample of the flow. Heretofore this has been a difficult matter, but I have provided a method wherein these calculations are readily accomplished, as now to be described.

The gas discharge line 3 is drilled and tapped as close to the separator as convenient, for example at 4, for the insertion of an internally threaded bushing 5. Threaded in the bushing 5 is a nipple 6, carrying a gate valve 7, having its discharge side provided with a similar nipple 8 that is connected to a stuffing box 9 through a reducer fitting 10. The stuffing box 9 is provided with an axial channel 11 extending through an externally threaded neck 12, on which is threaded a packing gland 13 for tightening a packing ring 14 about a draw-off tube 15.

The draw-off tube 15 is of suitable diameter to be slid through an opening 16 in the gland, and through the packing ring 14 into the channel 11, and has a closed, rounded end 17 provided with one or more inlet openings 18, extending through the wall of the tube in the manner of a Pitot tube. The opposite end of the tube 15 is connected by a union 19 with a nipple 20, connected to the inlet side of a shut-off valve 21. The outlet side of the valve 21 is provided with a nipple 22 that is screwed into the inlet fitting 23 of a gas sampler 24, embodying the features of the present invention.

The sampler 24 includes a cylindrical outer casing 25, having a closed end 26 carrying the inlet fitting 23, and having its opposite end provided with an annular external flange 27, to which is connected a removable head 28, to close that end of the cylinder as is clearly shown in Fig. 2, the head 28 being secured to the flange 27 by suitable fastening devices 29, which may be readily removed to allow removal of the head. The fitting 23 is fixed to the end wall 26 of the casing 25 in an internally threaded flange 30. Fixed within a bore 31 of the fitting is a tube 32, having one end aligning with the nipple 22, and its opposite end extending through a packing recess 33 in the fitting, and through an opening 34 in the end wall that conforms in diameter with the opening of the flange 30. Positioned in the packing recess is a packing ring 35 for encircling the tube 32, and to form a seal for the end of a filter cartridge, later described.

Fixed to the inner face of the wall 26 is a flange 36, having an internally threaded opening 37 aligning with the opening 34, and in which is threadedly mounted a nipple 38, which carries a casing 39 for the filter cartridge 40. The casing 39 includes a sleeve 41, of smaller diameter than the inner diameter of the casing 25, and of shorter length, to freely accommodate a head 42 for closing the end thereof. The head 42 is welded directly to one end of the sleeve 41, and has an internally threaded opening 44 for accommodating the nipple 38 to secure the cartridge casing concentrically within the casing 25. The nipple 38, after being screwed into the head 42, is then finally welded therewith.

Inserted within the opposite end of the sleeve is the filter cartridge 40, which preferably includes a glass cylinder 45, having a reduced neck 46 at one end, of suitable diameter to freely pass through the nipple 38 so that the end thereof sealingly engages the packing ring 35. The reduced portion of the cartridge also forms an annular shoulder 47 to sealingly engage against the packing ring 48 that is mounted in the recess of the head 42. The opposite end of the filter cartridge projects from the free open end of the sleeve 41, and is provided with a bell flange 49 to receive a conical-shaped stopper 50. The head 43 includes a flat bar of substantially greater length than the diameter of the sleeve 41, and has openings to engage over the threaded ends of draw bolts 51 that are anchored in a flange 52 fixed to the periphery of the sleeve 41, the draw bolts 51 being provided with nuts 53 whereby the head may be drawn against the stopper to wedge it fluid tight within the belled end of the filter cartridge. The head 43 is provided with an opening 54 that communicates with the interior of the cartridge through an aligning bore 55 in the stopper 50.

It is thus apparent that when the stopper is drawn in sealed engagement with the open end of the filter cartridge, the pressure applied by the nuts 53 also causes the cartridge to be tightly sealed against the packing ring 48, and when the nipple 38 of the shell 41 is screwed home in 36, the small end of the cartridge slides over tube 32 and seats against the packing ring 35.

Contained within the filter cartridge is a filtering material 56, preferably consisting of glass-wool, rock-wool, or similar material, that does not cause absorption of gases, but which filters from the gas all entrained liquids and solids.

The removable head 28 of the casing 25 is provided with a threaded opening 57 which aligns with the axis of the orifice 54, to mount a nipple 58 that connects with the inlet side of a needle valve 59, having its outlet side connected by a nipple 60 with a back pressure chamber 61. The back pressure chamber includes a cylindrical casing 62 having a threaded outer end 63 for mounting an orifice adapter cap 64 having an orifice plate seat 65. Removably inserted in the seat 65 is an orifice plate 66, having a critical flow orifice 67 therein for regulating flow of gas from the back pressure chamber 61. The orifice plate 66 is removably retained in its seat by a suitable fastening device 68.

In order to obtain the temperature of the gas within the casings 25 and 62, they are provided with wells 69 and 70 in which thermometers 71 and 72 are inserted to record the temperatures therein, as later described. The casings are also provided with pressure gauges 73 and 74 respectively, wherewith pressure of the gas in the chambers may be indicated.

The apparatus thus described may be supported in aligned position within the valve 7 on a trestle 75, of any suitable construction.

The gas discharge line is also drilled and tapped beyond the valve 7, as at 76, to provide for the insertion of a Pitot tube 77, or similar apparatus, wherewith the flow volume of the gas through the line 3 may be determined in a well known manner.

In using an apparatus constructed as described, the cylinder portion of the filter cartridge is filled with a quantity of filter material, such as glass-wool, rock-wool, or the like, that is non-absorptive, after which the stopper is inserted in the cartridge, and the cartridge containing the filtering material is accurately weighed. The weighed cartridge is then inserted through the open end of the casing 25, so that the neck thereof sets against the packing rings 35 and 48. The plate 43 is placed against the stopper 50, and the stopper is inserted in the open end of the cartridge and clamped in position by applying the nuts 53. The tube 15 is inserted through the stuffing box 9 and on into the pipe 3, through the valve 7 which has been opened. The gland 13 is then tightened and the tube 15 is connected to pipe 20 by the union 19. The tube 15 is marked so that the aperture or apertures at the end extending into pipe 3 may be turned up-stream.

A portion of the gas stream is then diverted through the tube 15, valve 21, and through the filtering material, into the interior of the casing 25 where the pressure thereof is indicated by the gauge 73, and the temperature by the thermometer 71. Upon opening the needle valve 59, the gas will flow into the back pressure chamber and through the orifice 67 of the plate 66. The rate of flow of gas through the tester is regulated to pass the maximum amount of gas at a reasonable low pressure drop across the filtering cartridge. This is important because if the pressure drop across the filter is great, the high velocity of the gas passing through the filter will result in "rivers" or small passageways being opened through the filtering medium, and should this occur practically all the filtering efficiency would be lost. The pressure drop is determined by the size of the tubing 15, cartridge 40 and the orifice 67, which are so proportioned that when the cartridge 40 is packed in proper manner with glass wool or the equivalent, the pressure drop will be the desired amount. The temperature and pressure of the gas in the back pressure chamber is indicated by the pressure gauge 74 and thermometer 72. The gas is allowed to flow through the filtering medium for a definite length of time during which time temperature and pressure of the gas is made of record. Likewise, the temperature and pressure in the back pressure chamber is also made of record. Having the temperature and pressure of the gas in the back pressure chamber, and knowing the size of the orifice 67, the flow volume of the gas passing through the filtering medium is readily ascertained.

During taking of these recordings, the flow volume through the delivery pipe 3 is also ascertained by the Pitot tube 77. Thus the relative proportion of the flow through the filtering medium and the flow through the delivery pipe may be readily calculated. The gas, upon flowing through the filtering cartridge, is relieved of any entrained liquid which is trapped on the filtering media. After the flow has continued for a definite period the valve 21 is closed.

At the close of a run, valve 21 is closed, and the back pressure chamber is disconnected by removing bolts 29. The nuts 53 are then loosened to allow the bar 43 to be swung aside, whereafter the cartridge 40 is removed. The filtering cartridge containing the filtering material is then carefully weighed to determine the change in weight, which represents the weight of the material that has been filtered from that portion of the gas stream that has been measured through the orifice 67 for the recorded time interval. Then, since the temperature and pressure at which the filtered material was collected are known, and since the size of the orifice is known, the volume of gas flowing through the filtering device, corrected to maintain discharge gas conditions, can be readily calculated. With the weight of the entrained oil, liquid, and solids that have been removed from this volume of gas and with the total volume of gas flowing from the separator known, the amount of oil, liquid and solid matter passing with the gas from the separator is readily calculated.

It is thus apparent that the measurement of the respective flow volumes, temperatures and pressures are taken simultaneously with the filtering out of the foreign material, so that calculation of the amount of oil lost in extremely large gas volumes is exceptionally accurate.

What I claim and desire to secure by Letters Patent is:

1. In an apparatus of the character described, a gas sampler including an outer casing, a cartridge removably supported in the casing for confining a body of filtering material, means for passing gas through the filtering material, means connected with the casing for indicating temperature and pressure of the gas passed through the filtering material means associated with said sampler for maintaining a definite flow of gas through the filtering material, a back pressure chamber connected with the outlet side of the cartridge, means controlling flow of gas from the back pressure chamber, and means indicating temperature and pressure of the gas in said back pressure chamber.

2. In an apparatus of the character described, a gas sampler including means for confining a body of filtering material, means for passing gas through the filtering material, means for indicating temperature and pressure of the gas passed through the filtering material, means associated with said sampler for maintaining a definite flow of gas through the filtering material, a back pressure chamber connected with said flow control means and having a gas outlet, an orifice plate controlling said outlet, and means for determining temperature and pressure of the gas in said back pressure chamber.

3. In an apparatus for determining the amount of liquid and solid matter entrained in a gas including a casing having inlet and outlet connections, a packing in the inlet connection, a cartridge containing shell of smaller diameter than the casing to provide an annular gas containing chamber, means connecting the shell with the casing concentrically with the inlet connection, a gasket ring in the shell, a filtering cartridge having a reduced neck portion for engaging the packing at the inlet connection and forming an annular seat engaging the gasket ring, a plug closing the opposite end of the filtering cartridge and having an outlet opening into the chamber, means connected with the shell for retaining the plug, means for admitting gas to the inlet connection, and means for discharging the gas at predetermined velocities through the outlet connection.

4. In an apparatus for determining the amount of liquid and solid matter entrained in a gas including a casing having inlet and outlet connections, a packing in the inlet connection, a cartridge containing shell of smaller diameter than the casing to provide an annular gas containing chamber, means connecting the shell with the casing concentrically with the inlet connection, a gasket ring in the shell, a filtering cartridge having a reduced neck portion for engaging the packing at the inlet connection and forming an annular seat engaging the gasket ring, a plug closing the opposite end of the filtering cartridge and having an outlet opening into the chamber, means connected with the shell for retaining the plug, means for admitting gas to the inlet connection, a back pressure chamber, valved means connecting the back pressure chamber with the outlet connection, and an orifice plate connected with the back pressure chamber for discharging gas from the back pressure chamber.

5. In an apparatus for determining the amount of liquid and solid matter entrained in a gas including an outer casing having inlet and outlet connections, a cartridge in the casing including a shell formed of material impervious to the passage of gas and having an inlet sealingly engaging with said inlet connection and having an outlet at its opposite end, a filtering material in said shell for trapping and retaining any liquid and solid matter entrained in the gas, said cartridge being spaced from the walls of the outer casing to form a gas chamber, means for maintaining a definite pressure in said chamber to maintain a definite flow of gas through the filtering material, and means connected with said outlet connection for determining the volume of gas passed through the filtering material.

6. In an apparatus for determining the amount of liquid and solid matter contained in a gas including a casing having gas inlet and outlet connections, a cartridge contained in said casing including a shell formed of material impervious to the passage of gas and having an inlet connected with said inlet connection and a restricted outlet opening to the interior of the casing, a filtering material in the shell for entrapping and retaining the liquid and solid matter entrained in gas delivered through said inlet connection, means for controlling pressure of gas in said casing to maintain a definite flow of gas through the filtering material, a back pressure chamber connected with said control means and having an orifice plate for controlling flow of gas from the back pressure chamber, and means for indicating the pressures and temperatures of the gas passing through said outer casing and in said back pressure chamber.

7. In an apparatus of the character described, a filtering cartridge, means for delivering gas to the filtering cartridge, means for maintaining a predetermined flow of gas through the filtering cartridge, a back pressure chamber for receiving the gas passed through said filtering cartridge and having a fixed orifice for the outlet of gas from the back pressure chamber, means connected with the back pressure chamber for indicating the pressure and temperature of the gas passed through said chamber, and means having connection with the filtering cartridge for indicating the temperature and pressure of the gas delivered from the filtering cartridge to the back pressure chamber.

GWYNNE RAYMOND.